United States Patent [19]

McKee

[11] Patent Number: 4,483,094
[45] Date of Patent: Nov. 20, 1984

[54] RODENT EXTERMINATING APPARATUS
[76] Inventor: James E. McKee, 4336 Overhill Dr., Dallas, Tex. 75205
[21] Appl. No.: 412,831
[22] Filed: Aug. 30, 1982

Related U.S. Application Data
[63] Continuation-in-part of Ser. No. 179,168, Aug. 18, 1980.
[51] Int. Cl.³ .......................................... A01M 23/14
[52] U.S. Cl. ......................................... 43/81; 43/83.5; 43/75; 43/99
[58] Field of Search ....................... 43/75, 81, 83.5, 99

[56] References Cited
U.S. PATENT DOCUMENTS

| | | | |
|---|---|---|---|
| 840,673 | 1/1907 | Ward | 43/75 |
| 1,198,332 | 9/1916 | Crisler | 43/75 |
| 2,199,167 | 4/1940 | Brooks | 43/75 |
| 2,360,651 | 10/1944 | Crumrine | 43/99 |
| 2,445,166 | 7/1948 | Crumrine | 43/99 |
| 2,531,568 | 11/1950 | Helme | 43/78 |
| 2,684,553 | 7/1954 | Schroeder | 43/81 |
| 3,468,054 | 9/1969 | Levine | 43/98 |
| 3,473,252 | 10/1969 | Krammer | 43/124 |
| 3,638,348 | 2/1972 | Lusk | 43/75 |
| 3,815,278 | 6/1974 | Beaton et al. | 43/99 |
| 3,827,176 | 8/1974 | Stirewalt | 43/98 |
| 3,896,581 | 7/1975 | Gabry | 43/81 |
| 4,074,456 | 2/1978 | Tidwell | 43/98 |
| 4,127,958 | 12/1978 | Peters et al. | 43/81 |
| 4,349,980 | 9/1982 | McKee | 43/81 |

FOREIGN PATENT DOCUMENTS
471253 2/1951 Canada .
670045 9/1963 Canada .
630906 10/1947 United Kingdom .

OTHER PUBLICATIONS
"Laser Beam Mousetrap", J. S. & A. Catalog, p. 30, 1978, Copy in 43/58.

Primary Examiner—Kuang Y. Lin
Assistant Examiner—M. Jordan
Attorney, Agent, or Firm—Hubbard, Thurman, Turner & Tucker

[57] ABSTRACT

A power operated rodent exterminating apparatus includes a pneumatic actuator for moving a pivotally mounted striking bar from a retracted position to a striking position and automatically returning to a retracted position. A detector plate is mounted on the apparatus frame in the path of the movement of the striking bar to a striking position in contact with a portion of the frame. Ejector mechanism including pivotally mounted opposed gate members are operable upon retraction of the striking bar to sweep the detector plate to clear a rodent therefrom. A control circuit is operable to sequentially effect actuation of the striking bar and the ejector mechanism and to repeatedly cycle the ejector mechanism until the detector mechanism is reset.

14 Claims, 4 Drawing Figures

RODENT EXTERMINATING APPARATUS

CROSS-REFERENCE TO RELATED APPLICATION

This application is a continuation-in-part of prior co-pending application Ser. No. 179,168 filed Aug. 18, 1980.

BACKGROUND OF THE INVENTION

1. Field of the Invention

The present invention pertains to a power actuated rodent exterminating apparatus having a striking bar which is moved between retracted and striking positions by a pressure fluid operated actuator. A second actuator is operable in timed relation to the actuation of the striking bar to effect removal of a rodent from the vicinity of the striking bar and the triggering mechanism.

2. Background

My prior co-pending application referenced above pertains to an automatically resetting exterminating apparatus including a pressure fluid actuator which is connected to a pivotal striking bar and is operable in response to sensing the presence of a rodent in the vicinity of the striking bar to move the striking bar from a retracted position to a striking position to deliver a fatal blow to a rodent. The aforementioned apparatus automatically resets the striking bar upon completion of movement of the bar to the striking position.

However, the further development of the inventive concept described and claimed in the reference application has brought the realization of the need for an improved arrangement of the working components of the apparatus, the need for suitable mechanism to remove a dead rodent from the vicinity of the striking bar so that the apparatus may be reused for successive exterminating operations and the need for improvements in the triggering mechanism for detecting the presence of a rodent.

The incorporation of an ejecting or removal mechanism for operation in coordination with the actuation of the striking bar has also brought on the requirement for an improved control system for sequentially operating the power actuator for the striking bar and a second power actuator for operation of the rodent removal or ejecting mechanism.

SUMMARY OF THE INVENTION

The present invention provides an improved power operated rodent exterminating apparatus of the type including a pressure fluid powered actuator which is adapted to move a rodent striking member between retracted and striking positions and return to a retracted position for automatic resetting of the apparatus. In accordance with one aspect of the present invention there is provided an improved arrangement of a pressure fluid actuator and a pivotally supported striking bar connected to the actuator and operable to move between a retracted position and a striking position for delivering a fatal blow to a rodent or the like.

In accordance with another aspect of the present invention there is provided an improved triggering mechanism for sensing the presence of a rodent or other varmint in the vicinity of the striking bar which will permit actuation of the striking bar to deliver a fatal blow to the rodent. The triggering mechanism of the present invention includes a pivotally mounted detector plate member which, upon contact by a rodent, will actuate a control circuit to initiate rapid actuation of the striking bar to move from a retracted position to a striking position and return to a retracted position.

In accordance with yet another aspect of the present invention there is provided a rodent exterminating apparatus having a power actuated ejecting mechanism for removing exterminated rodents from the vicinity of the striking bar and the detector plate whereby the apparatus may be ready for detection and extermination of another rodent. The power actuated ejecting mechanism apparatus includes an opposed piston pneumatic actuator connected to a pair of opposed pivotally mounted sweeper gates which are disposed in proximity to the detector mechanism and the striking bar for removal of a rodent which has expired in contact with the detector mechanism and in the vicinity of the path of movement of the striking bar.

In accordance with still a further aspect of the present invention there is provided a rodent exterminating apparatus having an improved automatic control circuit which, upon detection of a rodent or other varmint in the vicinity of the striking bar, actuates the main power actuator to forcibly strike the rodent with the striking bar, reset the striking bar, actuate the ejecting mechanism to remove the rodent from the vicinity of the detector mechanism and striking bar and condition the system for a subsequent operating cycle if the detector mechanism has been cleared.

The above described features and advantages of the present invention has well as additional superior aspects thereof will be appreciated upon reading the detailed description which follows in conjunction with the drawings.

DESCRIPTION OF THE PREFERRED EMBODIMENT

Figure 1:
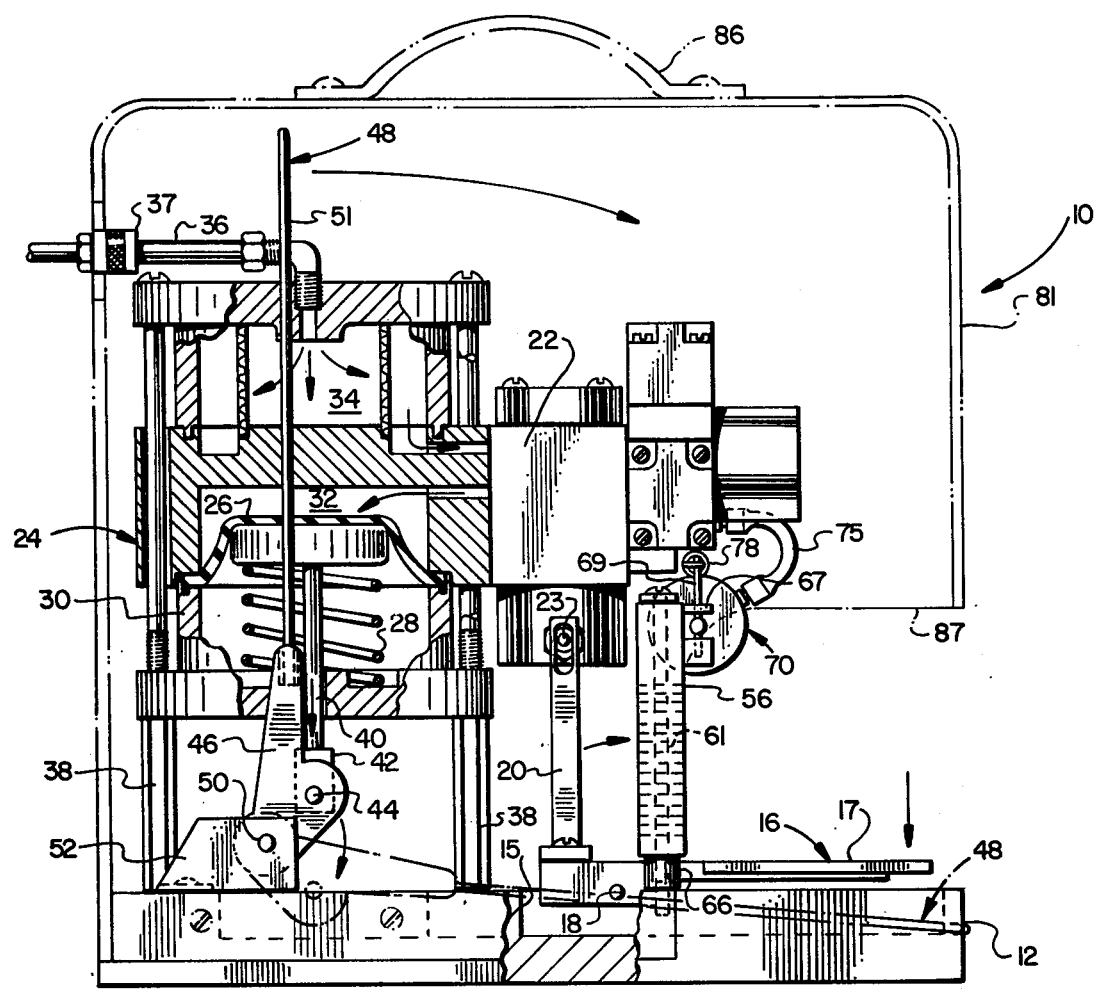
FIG. 1 is a side elevation, partially sectioned, of the improved rodent exterminatng apparatus of the present invention.

In the description which follows like parts are marked throughout the specification and drawings with the same reference numerals, respectively. The drawings are not necessarily to scale and certain features may be exaggerated in scale to better illustrate the structure.

Figure 2:
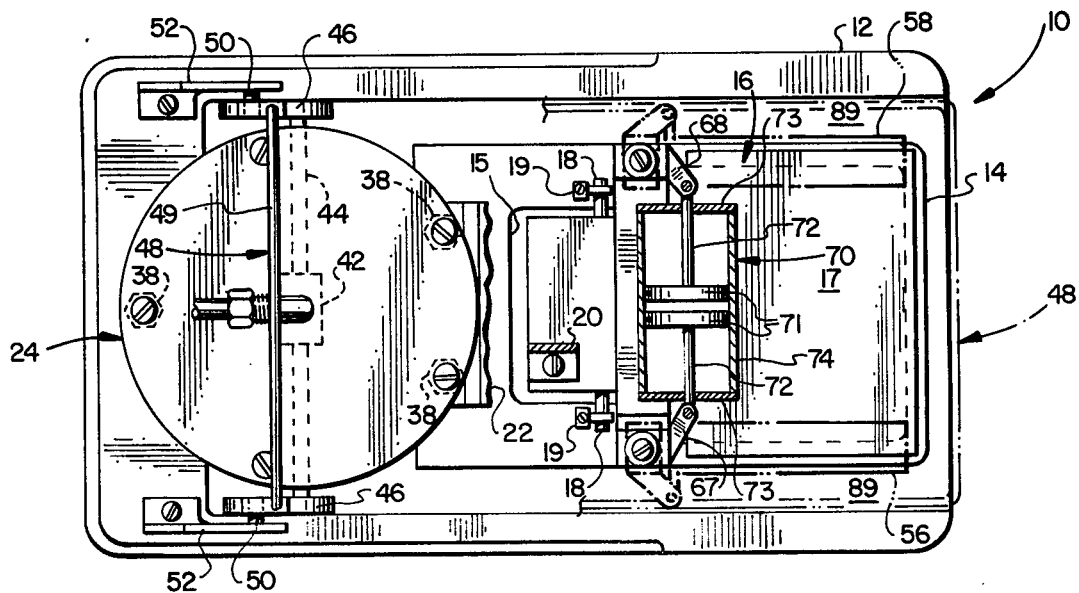
FIG. 2 is a plan view of the apparatus of the present invention with the control valves removed.
Figure 3:
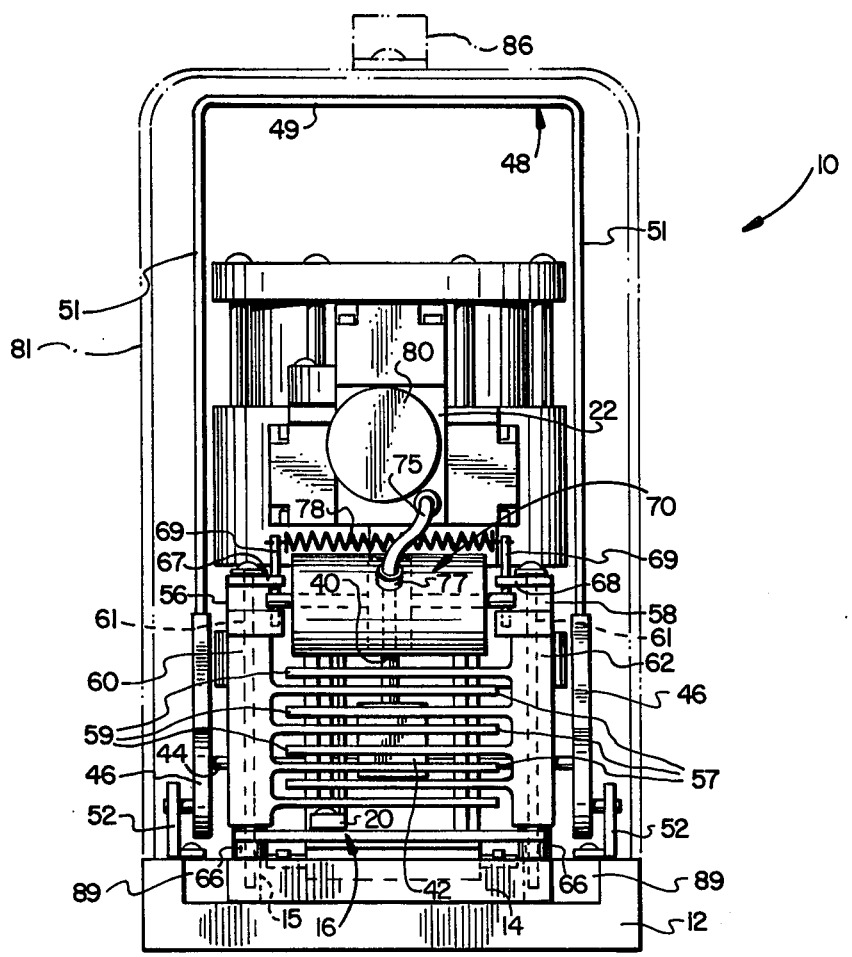
FIG. 3 is a side view of the apparatus illustrated in FIGS. 1 and 2.

Referring to FIGS. 1, 2 and 3 there is illustrated an improved power operating rodent exterminating apparatus generally designated by the numeral 10. The apparatus 10 includes a main frame or base member 12 comprising a generally rectangular plate structure including a somewhat rectangular shaped pedestal portion 14. A detector mechanism comprising a relatively thin flat plate member 16 is pivotally supported on pedestal portion 14 by a pair of opposed trunnions 18. The trunnions 18 are suitably supported in grooves formed in the pedestal portion 14 and are retained by bearing caps 19. A portion of the detector plate 16 is disposed in a recess 15 and is connected to an actuating link 20 extending generally vertically upward from the side of the detector plate opposite the rodent contact portion 17. The link 20 is suitably engaged with an actuator 23 for a pneumatic valve mounted on a manifold member, generally designated by the numeral 22 and which is adapted to support other pneumatic valve components to be described in further detail herein. The detector plate 16 is suitably balanced with respect to the axis of rotation of the trunnions 18 to biar the detector plate into a position which tends to rotate the detector plate counter clockwise, viewing FIG. 1, to the position illustrated and so as to not briar or deflect the actuator 23.

The apparatus 10 includes an improved arrangement of a flexible diaphragm piston type pneumatic actuator generally designated by the numeral 24. The actuator 24 is basically of the type disclosed in my prior co-pending application referenced herein. The actuator 24 includes a flexible diaphragm type piston member 26 and a biasing spring 28 disposed within the interior of the actuator housing 30. The piston 26 forms, together with the interior of the housing 30, a pressure chamber 32 into which pressure air may be introduced from the manifold 22. The actuator 24 also includes an accumulator chamber 34 which is adapted to receive a charge of pressure air from a source, now shown, by way of a conduit 36 and a quick release coupling 37. The accumulator chamber 34 is of sufficient volume to store a charge of pressure air of sufficient quantity to operate at least one cycle of the apparatus; however, the capability of the apparatus to perform repeated cycles of striking a rodent requires a source of pressure air having a volume in excess of the volume of the chamber 34. Those skilled in the art will appreciate, however, that the accumulator chamber could be increased in volume to, in effect, become the source of pressure air through a precharge operation.

The actuator 24 is mounted on a set of spaced apart upstanding legs 38 which are suitably secured to the base member 12 and are of sufficient length to provide for movement of a piston rod 40 in a substantially reciprocating manner in response to valving pressure fluid to and from the chamber 32. The piston rod 40 terminates in a head portion 42 which is suitably connected to crank means including a crossshaft 44. The opposed ends of shaft 44 are secured to respective spaced apart support arms 46 for a U-shaped striking bar, generally designated by the numeral 48. The arms 46 include respective trunnion members 50 extending laterally with respect to the piston rod 40 and journalled in spaced apart bearing support members 52 mounted on the base member 12. Accordingly, upon vertical downward movement of the piston rod 40 the aforedescribed linkage is operative to pivot the striking bar 48 from the retracted position shown by the solid lines in FIG. 1 to a striking limit position indicated by the dashed lines. Upon exhausting pressure fluid from the chamber 32, the spring 28 is operable to return the striking bar 48 to the retracted position. It has been determined in accordance with the present invention that the overall arrangement of the actuator 24 and the striking bar as described herein provides a more compact arrangement for the improved rodent exterminating apparatus while permitting the use of a striking bar having a longer lever arm such that a greater striking force may be applied to a rodent when struck by the base leg 49 or portions of the side legs 51 of the striking bar for a given actuating force applied by the actuator 24.

The apparatus of the present invention includes means for ejecting an expired rodent from the vicinity of the striking bar and from the detector plate 16 so that the apparatus may reset itself for operation through another cycle of rotating the striking bar from the retracted position to the striking position. The mechanism for clearing the apparatus 10 includes a pair of opposed gate members generally designated by the numerals 56 and 58. The gate members 56 and 58 are provided with respective sets of elongated fingers 57 and 59 which are interleaved in the retracted position of the gates as indicated in FIG. 3. The gate members 56 and 58 each include hub portions 60 and 62 which are provided with suitable elongated bores extending substantially perpendicular to the fingers 57 and 59 and through which project elongated pivot pins 61 supporting the respective gates for pivotal movement between the retracted position shown and an open sweeping position indicated by the phantom lines in FIG. 2. The gate support pins 61 may comprise elongated cylindrical members having threaded ends which are threadedly engaged with the raised anvil portion 14 of the base member 12. The gates 56 and 58 each rest on supporting spacer members 66 between the bottoms of the gate hubs and the surface of the anvil portion 14.

As illustrated in FIGS. 2 and 3 the gates 56 and 58 each include respective crank portions 67 and 68 comprising integral portions of the hubs 60 and 62. The crank portions 67 and 68 are adapted to be connected to respective opposed piston rods of an opposed piston fluid actuator 70. The actuator 70 includes two opposed pistons 71 having rod portions 72 extending in opposite directions through removable end caps 73 for cylinder member 74 and suitably connected to the opposed crank portions 67 and 68 along a line of action offset from the pivot axes of the respective gates 56 and 58. The actuator 70 includes means for introducing pressure fluid into a chamber formed in the cylinder 74 between the opposed pistons 71, comprising a flexible fluid conduit 75 connected to the cylinder by suitable fittings 77. The piston rods 72 are each provided with a transverse bore which journals a pivot pin 69 extending through spaced apart lobes of the crank portions 67 and 68. The pivot pins 69 extend generally parallel to the pivot axis of the support pins 61 above the actuator 70 and are interconnected by a coil spring 78. Accordingly, the gates 56 and 58 are biased into the closed interleaved position by action of the coil spring 78 but are adapted to be actuated by pressure fluid introduced into the cylinder actuator 70 to be rotated to the open position to sweep or eject a rodent or other article off of the detector plate 16 and also substantially clear of the striking bar 48. Pressure fluid is introduced into the cylinder actuator 70 by way of the conduit 75 which is connected to the manifold 22. The control of pressurization and venting of the actuator 70 is carried out by a valve 80 mounted on the manifold and which is part of a control circuit for operating the exterminating apparatus to be described herein in conjunction with FIG. 4.

The apparatus 10 is preferably provided with a generally rectangular boxlike cover 81 having opposed sidewalls 82 and 84 which are suitably secured to cooperating sidewalls of the base member 12. The cover 81 may also be provided with a suitable flexible carrying strap 86. The cover 81 is cut away at 87 in the vicinity of the detector plate 16 to permit access to the plate by a rodent or other pests. A suitable bait or attractant may be mounted within an envelope encompassing the path of the striking bar 48 as it moved from its retracted position to its striking position whereby a rodent, having activated the detector plate 16, will be forcibly struck and vital organs crushed between the striking bar 48 and the anvil portion 14. The base member 12 may, in fact, be formed with spaced apart longitudinal channels, as illustrated in FIGS. 2 and 3, for receiving the striking bar in its extended or striking position, which channels 89 provide means for forcibly pinning a portion of a rodent's body to inflict fatal injury thereto.

Figure 4:
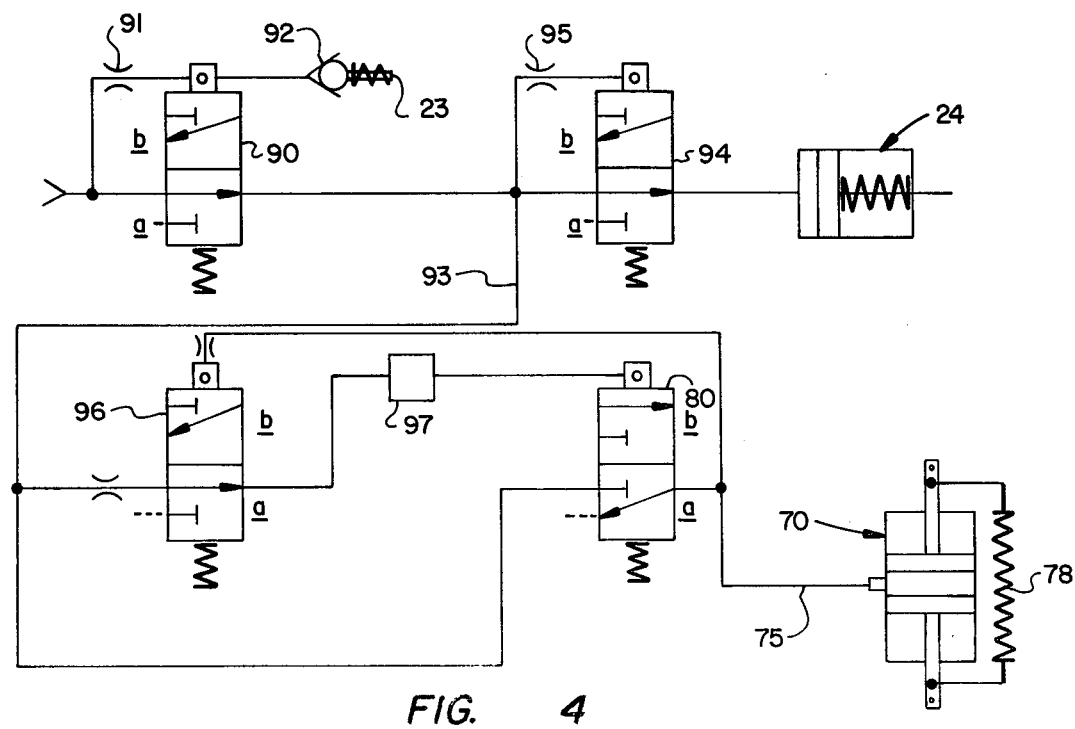
FIG. 4 is a schematic diagram of the control circuit for operating the apparatus of the present invention.

Referring now to FIG. 4 there is illustrated a schematic diagram of a control circuit for operating the actuator 24 and the actuator 70 to effect an operating cycle of the apparatus 10. The control circuit illustrated in FIG. 4 includes a pilot actuated two position valve 90 which is spring-biased into position a and biased by a pilot actuator into position b. The valve 90 is adapted to be in communication with a source of pressure fluid such as compressed air, and the pilot actuator for the valve 90 is normally in communication with the pressure fluid source by way of a flow-restricting orifice 91 to hold the valve in position b. The pilot actuator of the valve 90 is also in communication with a spring biased relief valve 92 having the actuator 23 which is connected to the link 20. In response deflection of the link 20 the valve 92 is unseated to vent pressure fluid from the pilot actuator of the valve 90 to cause valve 90 to shift to position a thereby allowing pressure fluid to be conducted to a two position pilot actuated valve 94. The valve 94 includes a pilot actuator in communication with the supply conduit between the valves 90 and 94 and responsive to a pressure fluid signal therein to move the valve 94 from its position a to its position b. However, the supply conduit for the pilot actuator valve 94 also includes a flow restricting orifice 95 which delays the operation of the pilot actuator to move the valve to position b until the passing of a suitable elapsed time commencing with the movement of valve 90 to its position a. Accordingly, the valve 94 is normally in position a and the valve 90 is normally in position b; however, upon relief of a pressure fluid signal to the pilot actuator of valve 90 as caused by triggering of the valve 92 the valve 90 moves to position a and valve 94 remains in its position a for a period of time to allow pressure fluid to flow to the actuator 24 to effect rapid movement of the striking bar to the striking position.

Upon a suitable pressure increase in the pilot actuator of valve 94, this valve moves to its position b to exhaust the chamber of the cylinder actuator 24 allowing it to retract the striking bar. However, if the portion 17 of the detector plate 16 is occupied, thereby having moved the link 20 and triggering link 23, the valve 90 will remain in its position a even though the valve 94 has moved to its position b. With the valve 90 remaining in position a pressure fluid is supplied by way of a branch conduit 93 to a third control valve, generally designated by the numeral 96. The valve 96 is similar to the valve 90 and is biased by a pressure fluid signal to its pilot actuator to move from position a to position b.

The control circuit illustrated in FIG. 4 includes a fourth control valve, generally designated by the numeral 80 and having a pilot actuator adapted to receive pressure fluid from the valve 96 by way of a time delay accumulator chamber 97. The valve 80 is biased by its pilot actuator into its position b and is spring-biased into position a. The valve 80 is also adapted to receive pressure fluid from conduit 93 and is in communication with the actuator 70 by way of conduit 75.

Upon initiation of an operating cycle of the apparatus 10 valve 90 is moved to position a to supply pressure fluid to conduit 93 and simultaneously to the valve 94 to effect operation of the actuator 24. As mentioned previously, after a suitable time delay the valve 94 is shifted to its position b to exhaust pressure fluid from the actuator 24 thereby allowing the striking bar to retract. However, valve 90 remains in position a as long as a signal is provided with respect to its pilot actuator to prevent the valve from shifting to position b. With a pressure fluid signal supplied to conduit 93 and through valve 96 in its position a, valve 80 is shifted to its position b after a brief time delay as provided by the time delay device 97. Upon shifting of valve 80 to its position b the actuator 70 is energized to effect a sweeping or ejecting actuation of the gates 56 and 58 to clear a rodent or other matter from the detector plate 16. Upon supplying pressure fluid to the actuator 70 the pilot actuator of valve 96 is also energized to effect movement of the valve to its position b to vent the pilot actuator of valve 80 thereby permitting the latter valve to return to its position a. Upon return of the valve 80 to its position a the actuator 70 is vented and the ejector gates are closed under the urging of coil spring 78 interconnecting the gates. If the sweeping action of the ejector gates has effected clearing of the detector plate 16 the valve 92 is closed thereby allowing valve 90 to move to its position b to vent pressure fluid from the conduit 93 and the pilot actuator of valve 94. Accordingly, all of the valves of the circuit will be reset to their initial starting positions in preparation for another operating cycle. However, if one ejector or sweeping stroke of the gates 56 and 58 does not effect clearing of the detector plate 16 the valve 92 will remain open and the valve 90 will remain in position a to supply pressure fluid to hold valve 94 in its position b.

With a pressure fluid signal present in conduit 93 the control circuit for the actuator 70 will continuously cycle to effect an oscillating sweeping or ejecting action of the gates 56 and 58. With a pressure fluid signal present in conduit 93 the valve 80 is initially moved to its position b followed by movement of valve 96 to its position b. Movement of valve 96 to its position b will exhaust the pilot actuator of valve 80 permitting valve 80 to move to its position a. Movement of valve 80 to position a will result in movement of valve 96 to position a whereupon the operating cycle of the valves 96 and 98 and the actuator 70 will be repeated substantially continuously until the detector plate 16 is sufficiently cleared to permit closing of the valve 92. In the event that the actuation of the gates 56 and 58 is ineffective to clear the detector plate to effect resetting of the control circuit, the circuit may be supplied with a stroke counter which upon exhausting a predetermined number of strokes of the ejector gates will effect a warning signal to require assistance in clearing the detector system of the apparatus.

From the foregoing description it is believed that it will be readily apparent to those skilled in the art as to how the apparatus and the control circuit therefore functions in a normal operating cycle. Those skilled in the art will also appreciate that various substitutions and modifications may be made to the apparatus of the present invention without departing from the scope and spirit thereof as recited in the appended claims.

What I claim is:

1. A pressure fluid actuated apparatus for exterminating rodents and the like comprising:
   a frame;

striking bar means movably mounted on said frame and operable to move from a retracted position to a position forcibly striking a rodent or the like;

a pressure fluid actuator operably connected to said striking bar means for moving said striking bar means between said retracted position and said striking position;

detecting means for detecting the presence of a rodent in a position to be struck by said striking bar means;

ejector means for ejecting a struck rodent from said position to be struck; and control means operably connected to said detecting means and responsive to said detecting means detecting the presence of a rodent in said position to be struck to sequentially cause said striking bar means to move from said retracted position to said striking position, and then return said stricking bar to said retracted position, and finally to effect operation of said ejector means to forcibly eject a struck rodent from said position to be struck.

2. A pressure fluid actuated apparatus for exterminating rodents and the like comprising:

a frame;

striking means movably mounted on said frame and operable to move from a retracted position to a position forcibly striking a rodent or the like and pinning said rodent between said striking means and means on said frame, said striking means including a perimeter member forming a base leg and opposed side legs, said side legs being connected to opposite ends of said base leg;

a pressure fluid actuator including piston means including a piston rod operably connected to said striking means for moving said striking means between said retracted position and said striking position, and said actuator is mounted on said frame in such a way that in its retracted position said striking means substantially encloses said actuator;

control means including means operable to detect the presence of a rodent in the vicinity of said striking means for causing said striking means to move from said retracted position to said striking position and return to said retracted position; and means responsive to operation of said control means to forcibly eject a struck rodent from the vicinity of said detecting means.

3. A pressure fluid actuated apparatus for exterminating rodents and the like comprising:

a frame;

striking means movably mounted on said frame and operable to move from a retracted position to a position forcibly striking a rodent or the like and pinning said rodent between said striking means and means on said frame;

a pressure fluid actuator operably connected to said striking means for moving said striking means between said retracted position and said striking position;

control means including a detector plate member mounted on said frame and operable to detect the presence of a rodent in the vicinity of said striking means and to undergo movement in response to engagement by a rodent to effect operation of said striking means to move from said retracted position to said striking position and return to said retracted position; and means responsive to operation of said control means to forcibly eject a struck rodent from said detector plate member.

4. The apparatus set forth in claim 3 wherein:

said ejector means include gate means, actuator means connected to said gate means and operable to effect operation of said gate means to sweep an area substantially including said detector plate member to remove a rodent from engagement therewith.

5. The apparatus set forth in claim 4 wherein:

said gate means includes a pair of opposed gate members pivotally mounted spaced apart on said frame, and said ejector means includes pressure fluid actuator means for moving said gate members from a retracted position to eject a rodent from operating contact with said plate member.

6. The apparatus set forth in claim 5 wherein:

said gate members include spring means interconnecting said gate members and operable to bias said gate members toward said retracted position.

7. The apparatus set forth in claim 6 wherein:

said gate members include opposed sets of fingers interleaved in said retracted position of said gate members to clear the surface of said plate members for engagement by a rodent.

8. The apparatus set forth in claim 3 wherein:

said ejector means includes a pressure fluid actuator for said ejector means and said control means includes a pressure fluid control circuit including a first valve responsive to said detecting means sensing the presence of a rodent to be actuated to supply pressure fluid to said actuator for said striking means, a second valve in communication with said first valve and operable to deliver pressure fluid to cause said actuator for said ejector means to eject a rodent from operable engagement with said detecting means, and time delay means interposed in said circuit to delay operation of said ejector means until said striking means has moved away from said striking position.

9. A pressure fluid actuated apparatus for exterminating rodents and the like comprising:

a frame;

striking means movably mounted on said frame and operable to move from a retracted position to a position forcibly striking a rodent or the like and pinning said rodent between said striking means and means on said frame;

a pressure fluid actuator operably connected to said striking means for moving said striking means between said retracted position and said striking position;

control means including means operable to detect the presence of a rodent in the vicinity of said striking means for causing said striking means to move from said retracted position to said striking position and return said retracted position;

ejector means responsive to operation of said control means to forcibly eject a struck rodent from the vicinity of said detecting means, said ejector means including a pressure fluid actuator for said ejector means; and said control means including a pressure fluid control circuit including a first valve responsive to said detecting means sensing the presence of a rodent to be actuated to supply pressure fluid to said actuator for said striking means, a second valve in communication with said first valve operable to deliver pressure fluid to cause said actuator for said ejector means to eject a rodent from operable engagement with said detecting means, and time delay means interposed in said circuit to delay operation of said ejector means until said striking means has moved away from said striking position.

10. The apparatus set forth in claims 8 or 9 and further including:
a third valve interposed in said circuit between said first and second valves and responsive to actuation of said actuator for said ejector means to reset said second valve to vent said actuator for said ejector means and to effect recycling of said actuator for said ejector means as long as said detecting means detects the presence of a rodent.

11. The apparatus set forth in claim 10 and further including:
a fourth valve interposed in said circuit between said first valve and said actuator for said striking means and operable to prevent energization of said actuator for said striking means as long as said detecting means continues to detect the presence of a rodent.

12. The apparatus set forth in claims 8 or 9 wherein:
said detector plate includes link means connected to a pilot valve operator for venting a pressure fluid signal holding said first valve in a position to block the flow of pressure fluid to said actuator for said striking means whereby said first valve is operable to move to a position to conduct pressure fluid to said actuator for said striking means.

13. A pressure fluid actuated apparatus for exterminating rodents and the like comprising:
a frame;
striking means movably mounted on said frame and operable to move from a retracted position to a position forcibly striking a rodent or the like and pinning said rodent between said striking means and means on said frame;
a pressure fluid actuator operably connected to said striking means for moving said striking means between said retracted position and said striking position, and said actuator including piston means including a piston rod operably connected to said striking means for moving said striking means between said retracted position and said striking position, said striking means including a perimeter member forming a base leg and opposed side legs, said side legs being connected to opposite ends of said base leg, said actuator being mounted on said frame in such a way that in its retracted position said striking means substantially encloses said actuator; and
control means including means operable to detect the presence of a rodent in the vicinity of said striking means for causing said striking means to move from said retracted position to said striking position, and return to said position.

14. The apparatus set forth in claim 13 wherein:
said frame includes a generally horizontally extending base plate, said actuator is supported on and above said base plate and having its piston rod extending downward from one end of said actuator, and said apparatus includes crank means connected to said piston rod and said side legs of said striking means for moving said striking means in response to energization of said actuator.

* * * * *

UNITED STATES PATENT AND TRADEMARK OFFICE
CERTIFICATE OF CORRECTION

PATENT NO. : 4,483,094

DATED : November 20, 1984

INVENTOR(S) : James E. McKee

It is certified that error appears in the above-identified patent and that said Letters Patent is hereby corrected as shown below:

Column 3, line 24; "source, now shown," should be --source, not shown,--

Signed and Sealed this

Seventeenth Day of September 1985

[SEAL]

Attest:

DONALD J. QUIGG

Attesting Officer

Commissioner of Patents and Trademarks—Designate